United States Patent [19]

Gaston

[11] Patent Number: 4,873,865
[45] Date of Patent: Oct. 17, 1989

[54] FUEL SENDER ASSEMBLY REQUIRING NO CALIBRATION

[75] Inventor: Robert D. Gaston, Dearborn Heights, Mich.

[73] Assignee: Ford Motor Company, Dearborn, Mich.

[21] Appl. No.: 289,883

[22] Filed: Dec. 27, 1988

[51] Int. Cl.$^4$ .................. G01F 23/32; G01F 23/36
[52] U.S. Cl. .................................. 73/317; 73/313; 340/620; 338/33
[58] Field of Search ................ 73/305, 317, 308, 313; 340/620; 338/33

[56] References Cited

U.S. PATENT DOCUMENTS

| | | | |
|---|---|---|---|
| 2,198,055 | 4/1940 | Liner | 73/313 |
| 4,114,130 | 9/1978 | Sutton et al. | 338/33 |
| 4,184,370 | 1/1980 | Schlick et al. | 73/313 |
| 4,361,039 | 11/1982 | van der Lely | 73/317 |
| 4,483,367 | 11/1984 | Ross, Jr. et al. | 73/317 |
| 4,507,961 | 4/1985 | Stradella | 73/317 |
| 4,557,144 | 12/1985 | Lucchini | 73/313 |
| 4,671,121 | 6/1987 | Schieler | 73/317 |
| 4,700,170 | 10/1987 | Weaver | 338/33 |
| 4,807,472 | 2/1989 | Brown et al. | 73/317 |

FOREIGN PATENT DOCUMENTS

| | | | |
|---|---|---|---|
| 2391454 | 1/1979 | France | 73/313 |
| 60-18720 | 1/1985 | Japan | 73/313 |
| 60-97217 | 5/1985 | Japan | 73/313 |
| 62-174616 | 7/1987 | Japan | 73/313 |
| 62-201324 | 9/1987 | Japan | 73/313 |
| 2197484 | 5/1988 | United Kingdom | 73/313 |

Primary Examiner—Allan M. Shoap
Assistant Examiner—Giego Gutierrez
Attorney, Agent, or Firm—Mark L. Mollon; Paul K. Godwin

[57] ABSTRACT

A fuel sender assembly using a wiper contact to generate a resistance proportional to fuel level in a fuel tank has a bent float rod engaged by a fork and a bore of a carrier element which rigidly carries a spring contact. The spring contact slidably engages a resistor on a resistor card within a housing. The carrier element extends through a slot in the housing such that it abuts the ends of the slot to provide rotational limits for the float rod. The resulting fuel sender assembly can be installed in a fuel tank with no electrical calibration being needed.

8 Claims, 5 Drawing Sheets

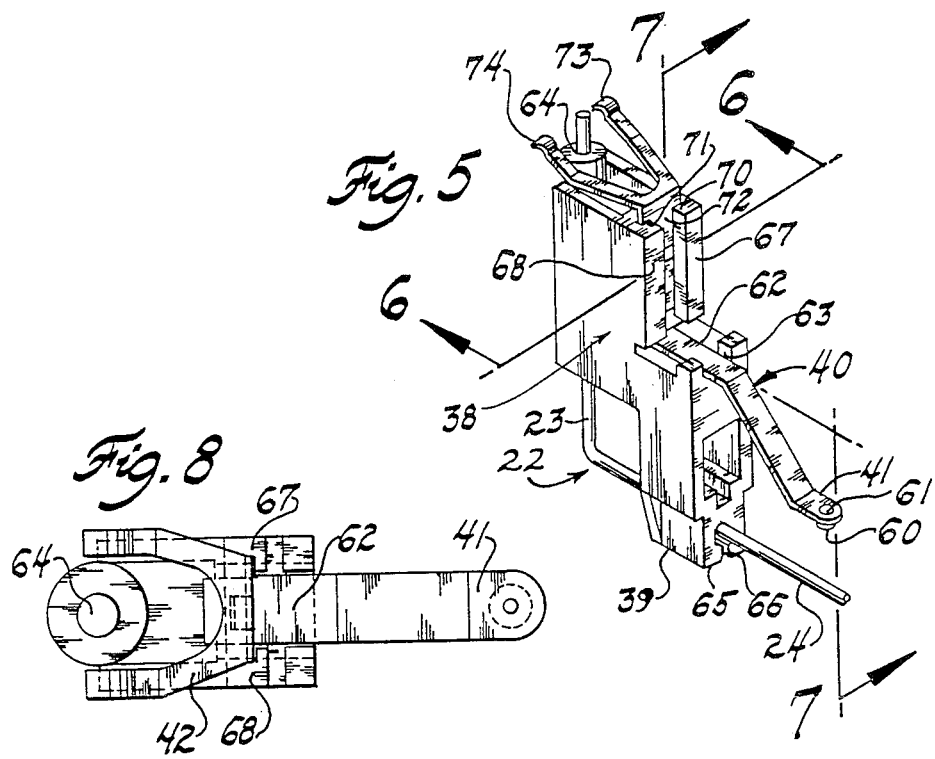
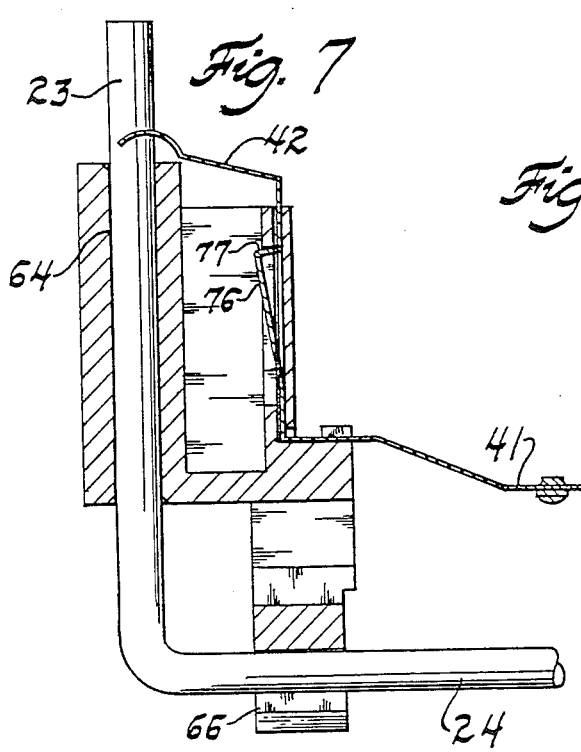
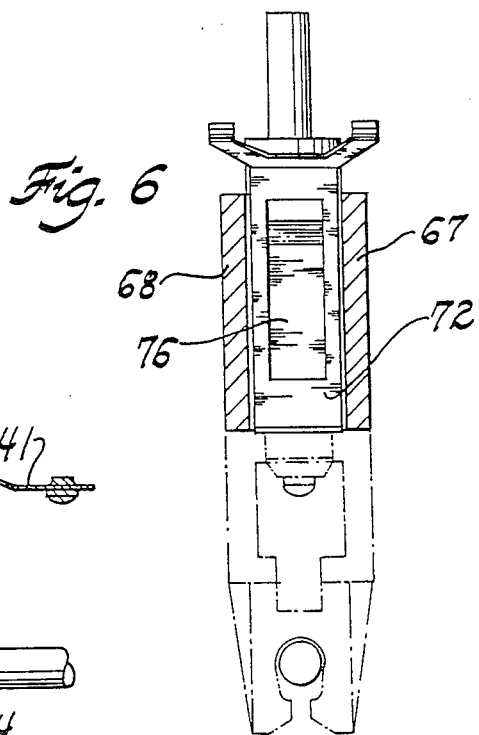

FUEL SENDER ASSEMBLY REQUIRING NO CALIBRATION

BACKGROUND OF THE INVENTION

The present invention relates, in general, to a sending unit for a float operated liquid level sensor and, more specifically, to a fuel level sender assembly for a fuel tank constructed in a manner to eliminate the need for any electrical calibration and to simplify its final assembly process.

Fuel level sensing in automobile fuel tanks is typically accomplished using a pivotable float which controls movement of a wiper contact over a resistor. Electrical connections to the wiper contact and the resistor result in a variable measure of resistance as the float moves in accordance with the level of fuel in the tank. A signal resulting from the variable resistance is sent to an indicator, such as a fuel gauge, to indicate to a vehicle operator the amount of fuel present in the tank.

The type of fuel sender assembly described above has achieved widespread use due to its simplicity and ease of manufacture relative to other designs, such as hydrostatic measuring systems or float systems with a mechanical linkage to a deflection gauge. Nevertheless, prior art pivotable float/wiper contact fuel senders are subject to several disadvantages.

In particular, prior art sender assemblies have required electrical calibration with the float at its zero level indicating position such that an electrical fuel gauge indicates properly at that level. For example, U.S. Pat. No. 4,532,491 issued to Rau et al, discloses a liquid level sender which has a swingably support lever with a float on one end and a wiper contact moving along an electrical resistor on the other end. The fuel sender must be calibrated either by displacing a pair of stops relative to the wiper contact, by rotating the entire structure with respect to the fuel tank, or by making the electrical resistor displaceable with respect to the wiper contact within the structural part of the sender assembly.

In U.S. Pat. No. 3,842,673 issued to Riddel, a fuel level sending unit is described having a stationary arm and a movable arm, one of the arms including a wire-wound resistor. The movable arm is supported by a coil spring. Calibration of the fuel sender assembly is accomplished by reconfiguring one of the contact arms.

In addition to requiring calibration, prior art sender assemblies have been generally difficult to manufacture due to large part count and complicated mechanical linkages.

An improved structure employed in the prior art is characterized by a bent float rod which is rigidly attached to a carrier for rotation. The carrier carries a spring contact which slides over a resistor card. Since the spring contact and the float rod are in fixed relationship and since the resistor card location can be accurately controlled within the housing, a predictable resistance can be obtained from the unit at each rotational position of the float rod.

In this prior art assembly, stop limits for the rotation of the float rod have been provided by external posts on a housing for abutting the portion of the float rod extending toward the float. While calibration can be provided by choosing the relative locations of the post, the resistor card, and the carrier (i.e., calibration of individual units is not needed), the structure is subject to inaccuracy or failure caused by drift as the posts and float rod deform or by breakage of the posts. Inaccuracy is also caused in the prior art device by variation in the spring contact to resistor card contact point caused by variation in compression of the spring contact.

Accordingly, it is a principal object of the present invention to provide a fuel sender assembly which requires no electrical or mechanical calibration.

It is a further object of the invention to provide a fuel sender assembly which is simple to manufacture.

It is another object of the invention to improve the accuracy of fuel level sensing.

SUMMARY OF THE INVENTION

These and other objects are achieved in a fuel sender assembly comprising a float rod, a housing member, a resistance element, a carrier element, and a spring contact means. The float rod is bent such that it has a pivot portion and an arm portion. The housing member has a rod hole rotatably securing the pivot portion and has an arcuate slot radially disposed from the rod hole. The resistance element is disposed in the housing member and has a first connection thereto. The carrier element extends through the arcuate slot and has an interior portion receiving the pivot portion and an exterior portion receiving the arm portion. The spring contact means is rigidly coupled to the carrier element for slidably contacting the resistance element as a second connection thereto. The carrier element abuts the ends of the arcuate slot to provide stops for the limits of rotation of the float rod.

BRIEF DESCRIPTON OF THE DRAWINGS

The novel features of the invention are set forth with particularlity in the appended claims. The invention itself, however, as to its structure, organization, and method of operation, together with further objects and advantages thereof, may best be understood by reference to the following description taken in conjunction with the accompanying drawings, in which:

FIG. 5 is a perspective view of the carrier element, spring contact, and float rod of FIG. 1 in greater detail.

FIG. 6 is a cross-sectional view along line 6—6 of FIG. 5.

FIG. 7 is a cross-section view along line 7—7 of FIG. 5.

FIG. 8 is an end view showing the carrier element and the spring contact.

DETAILED DESCRIPTION OF THE PREFERRED EMBODIMENT

Figure 1:
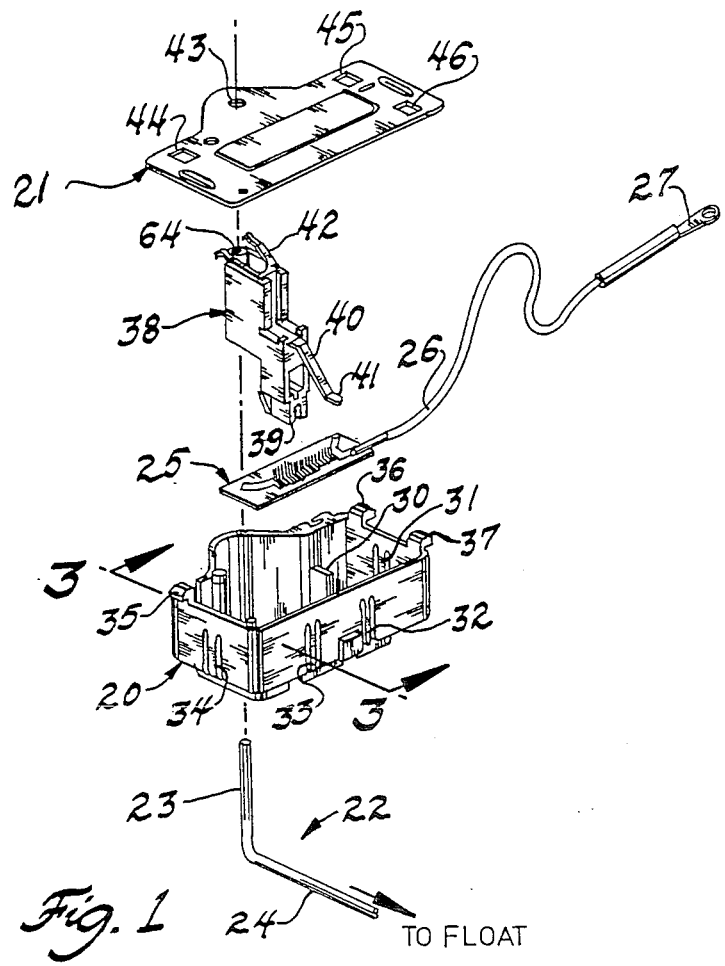
FIG. 1 is an exploded perspective view of a fuel sender assembly according to a preferred embodiment of the present invention.
Figure 3:
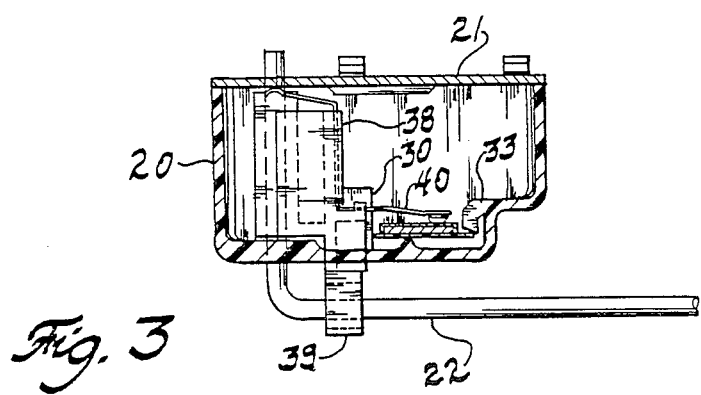
FIG. 3 is a side cross-sectional view of the assembly of FIG. 1 along line 3—3.
Figure 2A:
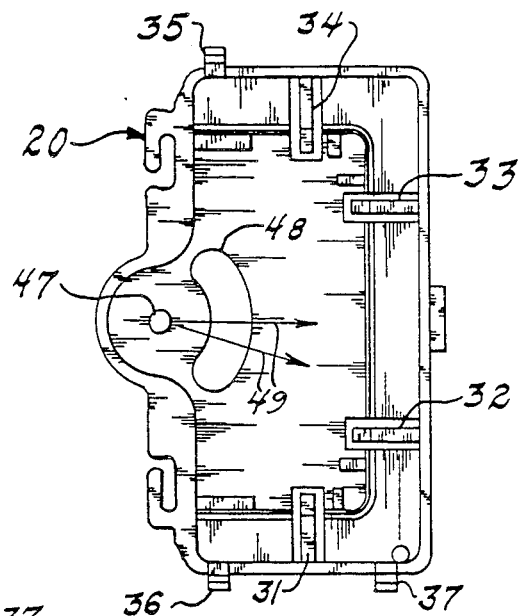
FIGS. 2A and 2B are a top view and a bottom view, respectively, of the housing member of FIG. 1.
Figure 2B:
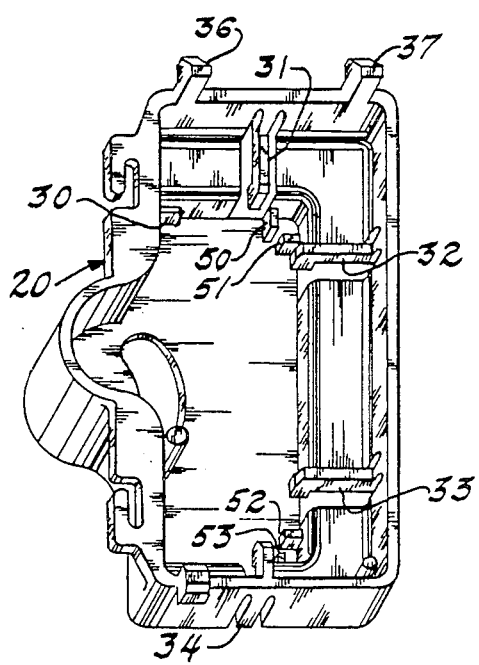

Referring now to FIGS. 1, 2a, 2b, and 3, a preferred embodiment of the invention is seen to include a housing having a cap member 20, preferably comprised of a moldable plastic material, and a base member 21, preferably comprised of a conductive metal sheet. A float rod 22 has a pivot portion 23 and an arm portion 24. The arm portion 24 extends to a float member which floats in the liquid being measured. Pivot portion 23 is rotatably secured in the housing by passing through a hole 47 in cap 20 and a hole 43 in a base member 21. Radial lines 49 extend from hole 47 indicating directions in which arm portion 24 projects.

A resistor card 25 is retained within the housing by an abutment 30 and a plurality of clips 31, 32, 33, and 34. Resistor card 25 may also be supported away from housing cap member 20 by support abutments 50, 51, 52, and 53.

A carrier element 38 is retained inside the housing and has a projecting end 39 comprising a fork for grasping arm portion 24 of the float rod after passing through an arcuate slot 48 in housing cap member 20. Carrier element 38 further contains a bore 64 for receiving pivot portion 23 of float rod 22 interior of the housing.

A spring contact element 40 is retained on carrier element 38 and has a contact end 41 and a contact end 42. Contact end 41 slidably engages the resistor card 25 and contact end 42 slidably engages base member 21. Thus, movement of arm portion 24, caused by varying levels of liquid in a fuel tank, is translated to spring contact 40 such that the electrical resistance between resistor lead 27 and base member 21 is proportional to fluid level.

Base member 21 is fixed to cap member 20 by means of snap projections 35, 36, and 37, being engaged in holes 44, 45, and 46.

By virtue of the shape and size of arcuate slot 48, the rotation of carrier element 38 (and thereby arm portion 24) has defined limits. These limits are well controlled by the manufacturing process and achieve a high level of durability. Furthermore, by varying the slot design and the resistor card design, empty and full liquid level positions can be accurately obtained relative to the housing without any need for calibration of individual units.

Figure 4:
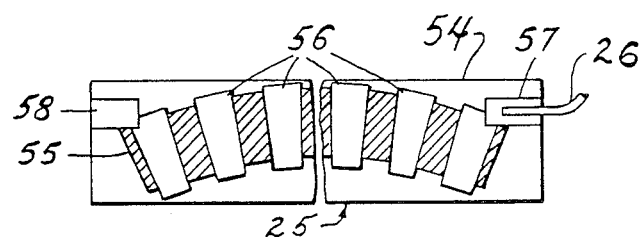
FIG. 4 is a top view of the resistor card of FIG. 1.

Referring now to FIG. 4, resistor card 25 is shown in greater detail. A resistive film 55 is disposed on a circuit card 54. A plurality of conductive strips 56 are laid down on resistive film 55 in order to improve electrical contact between the resistive film and spring contact end 41. Conductive strips 56 are elongated in a radial direction (i.e., along radial lines 49 in FIGS. 2a) from the pivot point of float pivot portion 23 and have a variable width in order to provide gaps of constant size between them, i.e., the sides of adjacent strips are parallel. The conductive strips on either end of the resistor card 25 include a pad 57 and 58 in order to provide connection of a contact lead wire 26 to either end of a card 25, as by soldering.

Depending upon the compression between spring contact end 41 and resistor card 25, the exact point of contact varies radially on resistor card 25. Consistent results are achieved in the resistive measurement provided by the connection of contact end 41 and conductive strips 56 due to the radial orientation and the widening of conductive strips 56 such that the radial location of contact end 41 along conductive strips 56 does not affect the actual measurement.

The structure of the fuel sender assembly shown in FIGS. 5–14 adapts the improved design concepts consisting of the slot/carrier element design and the radial resistor card of the invention into a complete sender assembly in order to achieve the objects of the invention.

Carrier element 38 and spring contact 40 are shown in greater detail in FIG. 5. Fork end 39 of carrier element 38 includes fork halves 65 and 66 defining an opening for receiving float rod arm portion 24. Fork end 39 and bore 64 provide for convenient manufacturing with insertion of float rod 22 into carrier element 38 proceeding by first inserting pivot portion 23 in bore 64 until arm portion 24 snaps into fork end 39 between fork halves 65 and 66.

Carrier element 38 includes a pair of fingers 67 and 68 for providing longitudinal slots 70 and 71 which receive spring contact 40. Spring contact 40 includes a first portion 62 having a width less than the distance between fingers 67 and 68, and has a second portion 72 wider than the distance between the fingers 67 and 68. Thus, spring contact 40 can be slid into carrier element 38 until first portion 62 is retained in a slot 63, preventing relative rotation between spring contact 40 and carrier element 38.

Spring contact 40 includes a pair of arcuate tips 73 and 74 for slidably engaging base member 21. Contact end 41 of spring contact 40 includes a rounded tip 60 retained in a hole 61 as by a press-fit. Rounded tip 60 improves slidable contact along conductive strips 56 on resistor card 25.

In one embodiment, spring contact 40 and carrier element 38 include means for retaining spring contact 40 in the fully engaged position. As shown in FIG. 6, a spring key 76 is formed in portion 72 of spring contact 40 such that spring key 76 extends toward carrier element 38. As shown in FIG. 7, a keyhole 77 is formed in carrier element 38 which receives spring key 76 in a nested position when spring contact 40 is fully inserted through the longitudinal slots. FIG. 8 is an end view of the same arrangement having the float rod removed.

Figure 9:
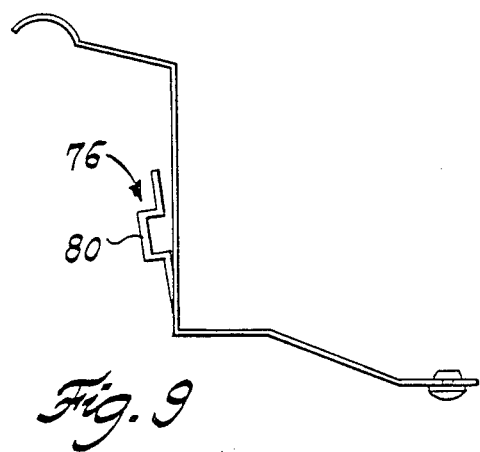
FIG. 9 is a side view of one embodiment of the spring contact.
Figure 10:
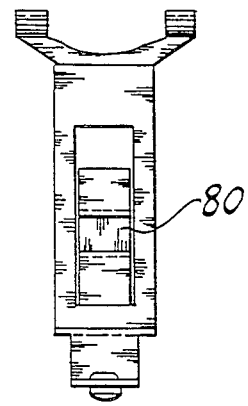
FIG. 10 is a front view of the spring contact of FIG. 9.

FIGS. 9 and 10 are side views of a spring contact 40 having an alternative embodiment for spring key 76, wherein a rectangular spring key if formed to more positively engage a keyhole of matching size in carrier element 38.

Figure 11A:
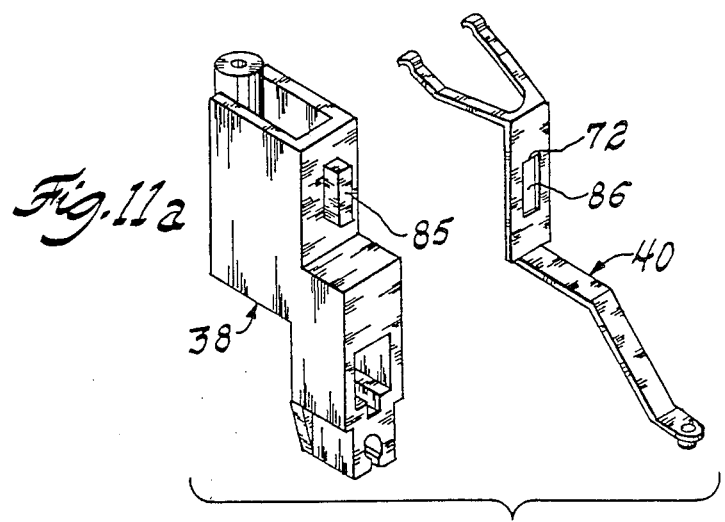
FIGS. 11a and 11b are perspective views of an alternative embodiment of joining the carrier element to the spring contact.
Figure 11B:
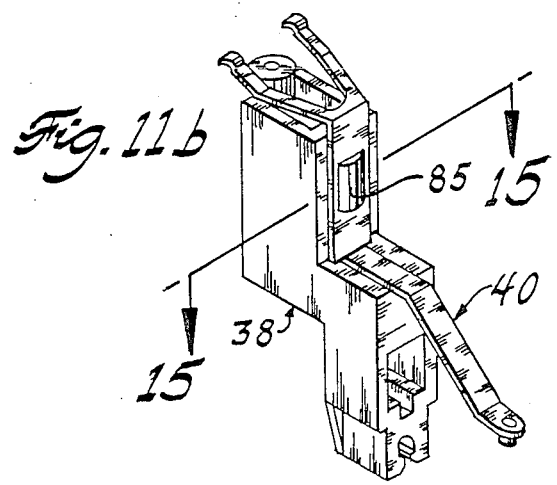
Figure 15:
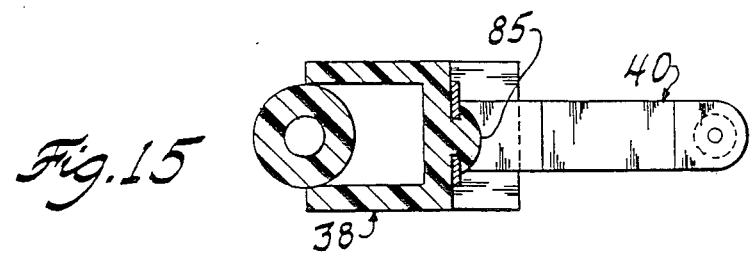
FIG. 15 is a top cross-sectional view along lines 15—15 of FIG. 11b.

FIGS. 11a, 11b, and 15 illustrate a further embodiment for retaining spring contact 40 on carrier element 38 without retaining fingers 67 and 68. A protrusion 85 extending from carrier element 38 passes through a receiving slot 86 in portion 72 of spring contact 40. Heat staking (melting) of protrusion 85 cause plastic material from protrusion 85 to cover the surface of portion 72 of spring contact 40 and, upon cooling, retains spring contact 40 in position.

Figure 14:
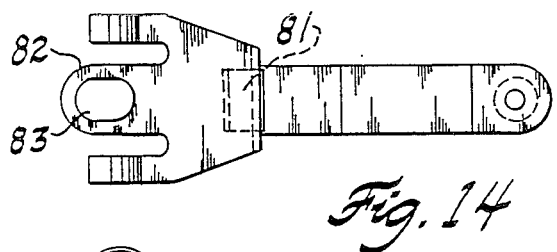
FIG. 14 is a bottom view of the alternative embodiment of FIG. 12.
Figure 12:
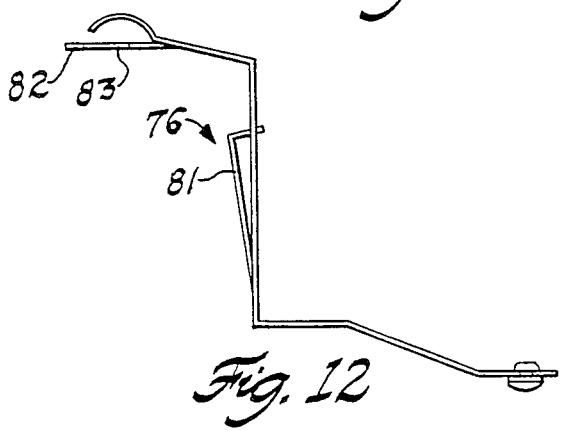
FIG. 12 is a side view of an alternative embodiment of the spring contact.
Figure 13:
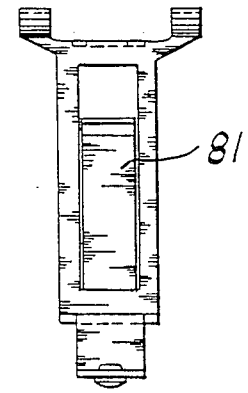
FIG. 13 is a front view of the spring contact of FIG. 12.

A further modification to spring contact 40 is shown in FIGS. 12-14, in which a tab 82 projects between arcuate tips 73 and 74. Tab 82 includes a passage 83 for receiving pivot portion 23 of float rod 22 to better retain spring contact 40 in proper position.

The foregoing has described a fuel sensor assembly having improved manufacturability due to the assembly process wherein the float rod passes through the housing and the carrier element and snaps into place in the fork end of the carrier element which extedns through the arcuate slot. Likewise, radial resistor card 25 simply snaps into place in the housing cap and the spring contact snaps into place on the carrier element while the housing parts themselves also snap together. Assembly of the fuel sender of the present invention is further simplified by the lack of any need to calibrate the fuel sender. The location of the arcuate slot relative to other parts is repeatable to an extent that no calibration is needed. Thus, the spring contact is always located on a specific radial resistance pad on the resistor card when the carrier element is located against an empty stop location of the arcuate slot.

Since the conductive strips on the resistor card are increasingly wider as they extend away from the float rod rotation center, variances resulting from different spring contact extension to conductor pad contact point are avoided. Contact by a lead to either end of the resistor card allows for empty fuel tank readings at either end of the resistor card and therefore allows installation of the fuel sender on any location within a fuel tank.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A fuel sender assembly comprising:
   a float rod having a pivot portion and an arm portion;
   a housing member haing a rod hole rotatably securing said pivot portion and having an arcuate slot radially disposed from said rod hole;
   a resistance element secured to said housing member and having a first connection thereto;
   a carrier element extending through said arcuate slot, said carrier element having an interior portion receiving said pivot portion and having an exterior portion receiving said arm portion; and
   spring contact means rigidly coupled to said interior portion of said carrier element for slidably contacting said resistance element as a second connection thereto;
   whereby said carrier element abuts the ends of said arcuate slot to provide stop limits for the rotation of said float rod.

2. The assembly of claim 1 wherein said resistance means is comprised of a thick-film resistor disposed on a circuit card and wherein said thick-film resistor includes a plurality of narrow conductor pads, each of said pads extending in a substantially radial direction from said rod hole.

3. The assembly of claim 2 wherein said conductor pads increase in width as they extend away from said rod hole in a radial direction, so that the width of gaps between adjacent pads are substantially constant.

4. The assembly of claim 1 wherein said housing member includes a conductive portion, said spring contact means slidably contacting said conductive portion.

5. The assembly of claim 1 wherein said float rod pivot portion and arm portion are substantially perpendicular to each other.

6. A fuel sender assembly comprising:
   a housing member having circuit card retaining clips, an arcuate carrier receiving slot, and a rod receiving hole located substantially at the axis of said carrier slot;
   a resistor card having an elongated resistance element, said resistor card being retained in said housing member by said retaining clips;
   a carrier element having an extension protruding through said receiving slot and having a bore aligned with said rod receiving hole;
   a float rod having a first end extending through said rod receiving hole and said bore and having a second end adapted to be connected to a float, said float rod being fixed with respect to said carrier element and being rotatable with respect to said housing member whereby said carrier element abuts the ends of said arcuate slot to provide stop limits for the rotation of said float rod; and
   a spring contact affixed to said carrier element, said spring contact having one end slidably contacting said resistance element.

7. The assembly of claim 6 wherein said housing member includes a conductive base portion and wherein said spring contact has its other end in contact with said conductive base portion.

8. The assembly of claim 6 wherein said resistor card further includes a plurality of narrow conductor pads disposed on said resistance element and each of said pads extending in a substantially radial direction from said rod receiving hole, said conductor pads increasing in width as they extend away from said rod receiving hole in a radial direction, so that the width of gaps between adjacent pads are substantially constant.

* * * * *